United States Patent
Kim et al.

(10) Patent No.: US 7,839,525 B2
(45) Date of Patent: Nov. 23, 2010

(54) APPARATUS, SYSTEM AND METHOD OF PROVIDING INTERNET PRINT SERVICE VIA HOME NETWORK

(75) Inventors: Yoon-soo Kim, Suwon-si (KR); Young-goo Ko, Anyang-si (KR); Sang-sun Choi, Suwon-si (KR); Jeong-ja Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1064 days.

(21) Appl. No.: 11/585,977

(22) Filed: Oct. 25, 2006

(65) Prior Publication Data

US 2007/0091364 A1    Apr. 26, 2007

(30) Foreign Application Priority Data

Oct. 25, 2005    (KR) ...................... 10-2005-0100840

(51) Int. Cl.
*G06F 15/00* (2006.01)
*G06F 15/16* (2006.01)

(52) U.S. Cl. ..................................... 358/1.15; 709/203

(58) Field of Classification Search ................ 358/1.15, 358/1.13, 1.14, 1.16, 1.18, 477, 402; 709/207, 709/228, 201, 203, 223, 219; 370/235; 380/243; 715/765, 764, 744; 719/330, 321, 327, 316, 719/315
See application file for complete search history.

(56) References Cited

U.S. PATENT DOCUMENTS

2006/0022453 A1*   2/2006   Cosgrove ..................... 283/116

FOREIGN PATENT DOCUMENTS

| CN | 1402117 A | 3/2003 |
|---|---|---|
| CN | 1648845 A | 8/2005 |
| CN | 1685306 A | 10/2005 |
| JP | 2002-191001 A | 7/2002 |
| JP | 2003-46833 A | 2/2003 |
| JP | 2004-64422 A | 2/2004 |
| KR | 10-2001-00448601 A | 6/2001 |

* cited by examiner

*Primary Examiner*—Saeid Ebrahimi Dehkordy
(74) *Attorney, Agent, or Firm*—Sughrue Mion, PLLC

(57) ABSTRACT

Provided are an apparatus, system and method for providing an Internet print service in a home network, more particularly, an apparatus, system and method for more conveniently providing an Internet print service via a UPnP printer in a home network. The apparatus includes a UPnP printer managing unit supplying an interface to provide an Internet print service and receiving a print job request from a UPnP printer control point; a job-processing unit making a request for a print service to an external Internet print site in response to the print job request; and a user-information-managing unit managing information necessary when the Internet print service is used.

10 Claims, 10 Drawing Sheets

FIG. 6

```
<device>
<deviceType>urn:schemas-upnp-org:device:Printer:1</deviceType>
<friendlyName>Samsung Printing Service</friendlyName>
<manufacturer>Samsung Electronics Co., Ltd.</manufacturer>
<manufacturerURL>http://www.samsung.co.kr/printingservice</manufacturerURL>
<modelDescription>Internet Printing</modelDescription>
<modelName>BRAND NAME Internet Photo Printing Service</modelName>  (1)
<modelNumber>model number</modelNumber>
<modelURL>URL to model site</modelURL>
...
</device>
```

APPARATUS, SYSTEM AND METHOD OF PROVIDING INTERNET PRINT SERVICE VIA HOME NETWORK

CROSS REFERENCE TO RELATED APPLICATION

This application claims priority from Korean Patent Application No. 10-2005-0100840 filed on Oct. 25, 2005 in the Korean Intellectual Property Office, the disclosure of which is incorporated herein by reference in its entirety.

BACKGROUND OF THE INVENTION

1. Field of the Invention

The present invention relates to an apparatus, system and method of providing an Internet print service via a home network, and more particularly, to an apparatus, system and method of providing an Internet print service via a home network that allow a service of an Internet printing site to be more conveniently provided by a UPnP printer via the home network.

2. Description of the Related Art

In general, a home network is configured using a private network based on the Internet Protocol (hereinafter, referred to as "IP"). Thus, a variety of devices used in the home, including personal computers (PCs), intelligent appliances and wireless devices, are connected to one another and controlled through a single network.

A home network method is provided such that a common virtual computing environment called middleware is constructed for devices in a private network and an application is provided thereby. Communications between various devices via home network are possible using the middleware, such as home audio/video interoperability (HAVI), Universal Plug and Play Control Device (UPnP), Java Intelligent Network Infra-structure (Jini), and HWW (Home Wide Web).

In the current home network, based on a wired/wireless communication network such as mobile communication, high-speed Internet, or the like, devices in the home are interconnected to each other though the network, and various services can be provided irrespective of time, place, and device types. Further, user convenience is greatly improved by providing services through intelligent interlocking.

Accordingly, a user can use various types of external services and contents thereof without a separate interface on the basis of the devices connected through the home network.

For example, it is possible for the user to download music or movies from an external Internet site and play the corresponding content via devices provided in the home (e.g., DTV programs and Wifi-Audio).

FIG. 1 is a diagram illustrating a construction of a UPnP printer control point and UPnP printer-controlled devices in accordance with the related art.

As shown in FIG. 1, a UPnP printer system includes a Universal Plug and Play Printer Control Point (hereinafter, simply referred to as "UPnP printer control point") 10 and a plurality of Universal Plug and Play Printer-controlled devices (hereinafter, simply referred to as "UPnP printer-controlled devices") 21 and 22 (i.e., 20 in FIG. 2).

The UPnP printer system includes the UPnP printer control point 10 and the UPnP printer-controlled device 20. Here, a controlled device or a device providing services is referred to as a UPnP printer-controlled device 20, and a controlling device or a client is referred to as a UPnP printer control point 10.

In addition, the UPnP printer control point 10 and the UPnP printer-controlled device 20 exist in the same network, and transmit and receive control commands by using a predetermined message protocol.

FIG. 2 is a flowchart illustrating a method of outputting data by using the UPnP printer control point and the UPnP printer-controlled device in accordance with the related art. Here, the UPnP printer control point 10 makes a request for services that are provided by the UPnP printer-controlled device 20. In this case, the UPnP printer-controlled device 20 performs the following operation in order to provide a print service.

A Create-Job operation is the first step of a print job. Here, the UPnP printer-controlled device 20 transmits job identification information to control the print job and data-sink location information to upload data. In the case of a data format that cannot be output, the UPnP printer-controlled device 20 rejects the request of the UPnP printer control point 10, and sends an error message. Table 1 shows arguments related to operations for the print job.

TABLE 1

| Argument | Direction | RelatedStateVariable |
|---|---|---|
| JobName | IN | JobName |
| JobOriginatingUserName | IN | JobOriginatingUserName |
| DocumentFormat | IN | DocumentFormat |
| Copies | IN | Copies |
| Sides | IN | Sides |
| NumberUp | IN | NumberUp |
| OrientationRequested | IN | OrientationRequested |
| MediaSize | IN | MediaSize |
| MediaType | IN | MediaType |
| PrintQuality | IN | PrintQuality |
| JobId | OUT | JobId |
| DataSink | OUT | DataSink |

A Cancel-Job operation is performed when a client cancels a print job. It is possible for the UPnP printer control point 10 to cancel the corresponding print job on the basis of the job identification information of the UPNP printer-controlled device 20 which is transmitted at the request of the print job. Table 2 shows an argument related to the Cancel-Job operation.

TABLE 2

| Argument | Direction | RelatedStateVariable |
|---|---|---|
| JobId | IN | JobId |

A Get-Printer-Attributes operation is for retrieving specific state attributes showing the status of a printer. A Get-Job-Attributes operation is to get state variables related to the print job. Table 3 shows arguments related to the Get-Printer-Attributes operation and Table 4 shows arguments related to the Get-Job-attributes operation.

TABLE 3

| Argument | Direction | RelatedStateVariable |
|---|---|---|
| PrintState | OUT | PrintState |
| JobName | IN | JobName |
| JobIdList | OUT | JobIdList |
| JobId | OUT | JobId |

TABLE 4

| Argument | Direction | RelatedStateVariable |
|---|---|---|
| JobId | IN | JobId |
| PrintStateReason | OUT | PrintStateReason |
| JobOriginatingUserName | OUT | JobOriginatingUserName |
| JobMediaSheetsCompleted | OUT | JobMediaSheetsCompleted |

HTTP POST is used when the client transmits data, which will be printed, to the UPnP printer-controlled device 20. Here, the data-sink location information to upload data is transmitted together with the job identification information after the Create-Job operation is requested.

As shown in FIG. 2, when an application 30 mounted with the UPnP printer control point 10 sends a request for printing data to the UPnP printer-controlled device 20 (S200), the UPnP printer control point 10, which has received the print request from the application 30, calls a Create-Job operation, which is provided by the UPnP printer-controlled device 20 (S210).

In this case, a print-processing unit 20*a* of the UPnP printer-controlled device 20 stores a print option in response to the print request (S220), and transmits job identification information and data-sink location information on the corresponding print job to the UPnP printer control point 10 (S230).

Next, the UPNP printer control point 10 transmits the data to be printed to the UPnP printer-controlled device 20 on the basis of the data-sink location information (S240). When the data from the UPnP printer control point 10 is uploaded, the print-processing unit 20*a* of the UPNP printer-controlled device 20 analyzes the uploaded data (S250) and transmits the analyzed data to a print engine 20*b*, thereby performing a print service (S260).

Further, the print-processing unit 20*a* of the UPnP printer-controlled device 20 transmits a printing result to the UPnP printer control point 10 (S270), and the UPNP printer control point 10 transmits the printing result to the application 30 (S280).

FIG. 3 is a flowchart illustrating a general process for printing photographs over the Internet.

As shown in FIG. 3, the user visits websites, uses a service such as image editing, which is similar to an online print service currently being provided, and then orders prints.

A server, which provides the print service on the online site, receives images (e.g., those captured by a digital camera) uploaded by a user (S300), and stores the uploaded images in an image-storing unit of the server (S310).

Next, the server receives print information (e.g., quantities, ranges and sizes of prints) on the images to be printed from the user (S320). Here, specifications on quantities, ranges and sizes of prints are the same as those of offline digital photo-print services.

Next, the server receives delivery information for the printed photographs from the user (S330). Here, the user may receive the printed photographs by home-delivery or registered mail, similar to existing online print services. The user may also receive the printed photographs by selecting a particular offline business.

The order particulars for photo-printing is output and payment for the print service is processed (S340), and the server providing the print service sends a request for a lab code to a service-provider server (S350).

A photo-printing job is allocated to the nearest lab of an offline business where the user will pick up the printed images. In the lab, the received images are printed and delivered to the designated offline business.

Next, the user picks up the photographs printed according to the user's order, at a place designated by the user. Here, the online business may be a business which has been providing the print service or a new business. The offline business can be a convenience store, an arcade, a lab, or a photo studio.

However, in the conventional UPNP printer-controlled device 20, images can be printed only through a printer in the home network, and it may be impossible to propose a method of using an external photo-print service.

In addition, for the photo-printing service over the Internet, access to a corresponding Internet site can be made only by a PC, and the user must upload data to be printed, which can be inconvenient.

In Korean Patent Application No. KR-2001-048601 (Home gateway system for connecting a home network and access network, each having diverse protocols and network interfacing method thereof), a system, used by a home network, for converting data according to a corresponding protocol into Ethernet packet data, and transmitting the converted Ethernet packet data, is disclosed. However, a technique for allowing a user to conveniently use an online print service by using a device in a home network is not disclosed therein.

SUMMARY OF EXEMPLARY EMBODIMENTS OF THE INVENTION

An aspect of exemplary embodiments of the present invention is to allow a user to conveniently use an Internet print service by using a device in a UPnP framework-based home network.

Aspects of the present invention are not limited to those mentioned above, and other aspects of the present invention will be apparently understood by those skilled in the art through the following description.

According to an exemplary embodiment of the present invention, there is provided an apparatus for providing an Internet print service in a home network, the apparatus including a UPnP printer managing unit supplying an interface to provide an Internet print service and receiving a print job request from a UPnP printer control point; a job-processing unit sending a request for a print service to an external Internet print site in response to the print job request; and a user-information managing unit managing information necessary when the Internet print service is used.

According to another exemplary embodiment of the present invention, there is provided a system providing an Internet print service in a home network, the system including a UPnP printer control point receiving a print job request from a user and requesting a print service for predetermined data; a UPnP printer-controlled device requesting an Internet print service to an Internet print site in response to the request of the UPnP printer control point; and an Internet print service server providing an Internet print service in response to the Internet print service requested from the UPnP printer-controlled device.

According to yet another exemplary embodiment of the present invention, there is provided a method of providing an Internet print service in a home network, the method including requesting a print service for predetermined data to a UPnP printer-controlled device when a print job request is received from a user; sending a request for user authentication to an Internet print service server in response to the print service request; receiving job identification information and data-server location information to upload data to from the Internet print service server when the user is a registered member of an Internet print site on the basis of a result of the user authentication; transmitting the provided job identification information and data-sink location information to the UPNP printer control point; receiving the predetermined data from the UPNP printer control point on the basis of the job identification information and data-sink location information; and uploading the transmitted data to the Internet print site.

The details of other examples are included in the below detailed description and the appending drawings.

BRIEF DESCRIPTION OF THE DRAWINGS

The above and other features and aspects of the present invention will become apparent by describing in detail exemplary embodiments thereof with reference to the attached drawings, in which:

FIG. 6 is a diagram illustrating a description of a UPNP printer-controlled device which provides an Internet print service in a home network in accordance with yet another embodiment of the present invention;

DETAILED DESCRIPTION OF EXEMPLARY EMBODIMENTS

Figure 1:
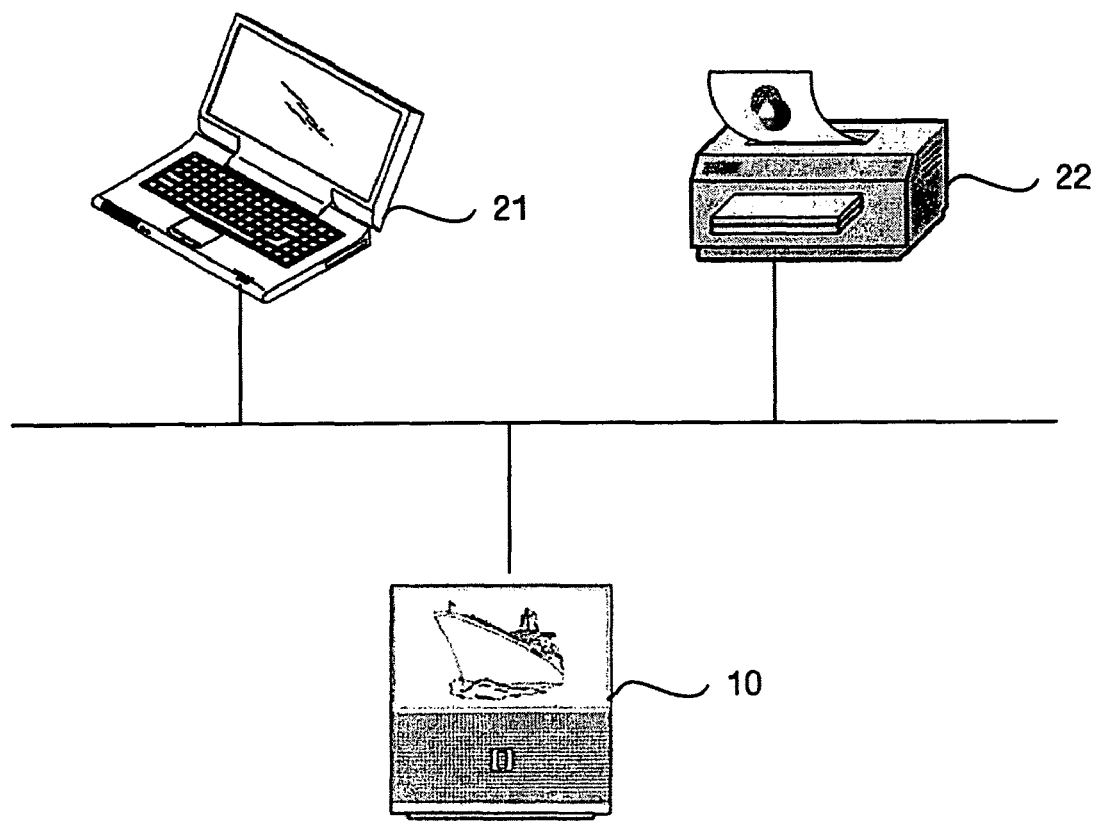
FIG. 1 is a diagram illustrating a construction of a UPNP printer control point and UPnP printer-controlled devices in accordance with the related art.
Figure 2:
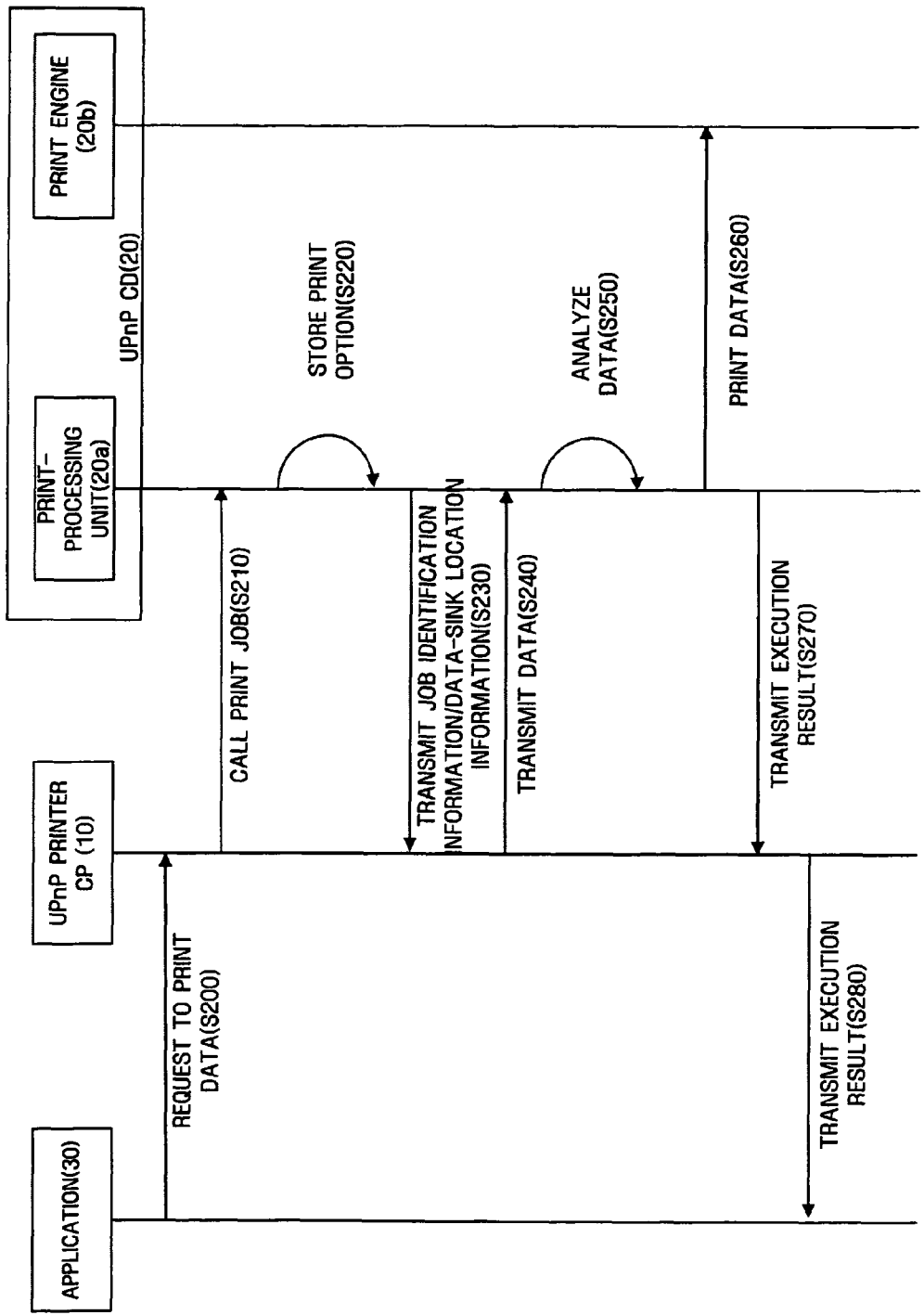
FIG. 2 is a flowchart illustrating a method of outputting data by using the UPNP printer control point and the UPnP printer-controlled device in accordance with the related art.
Figure 3:
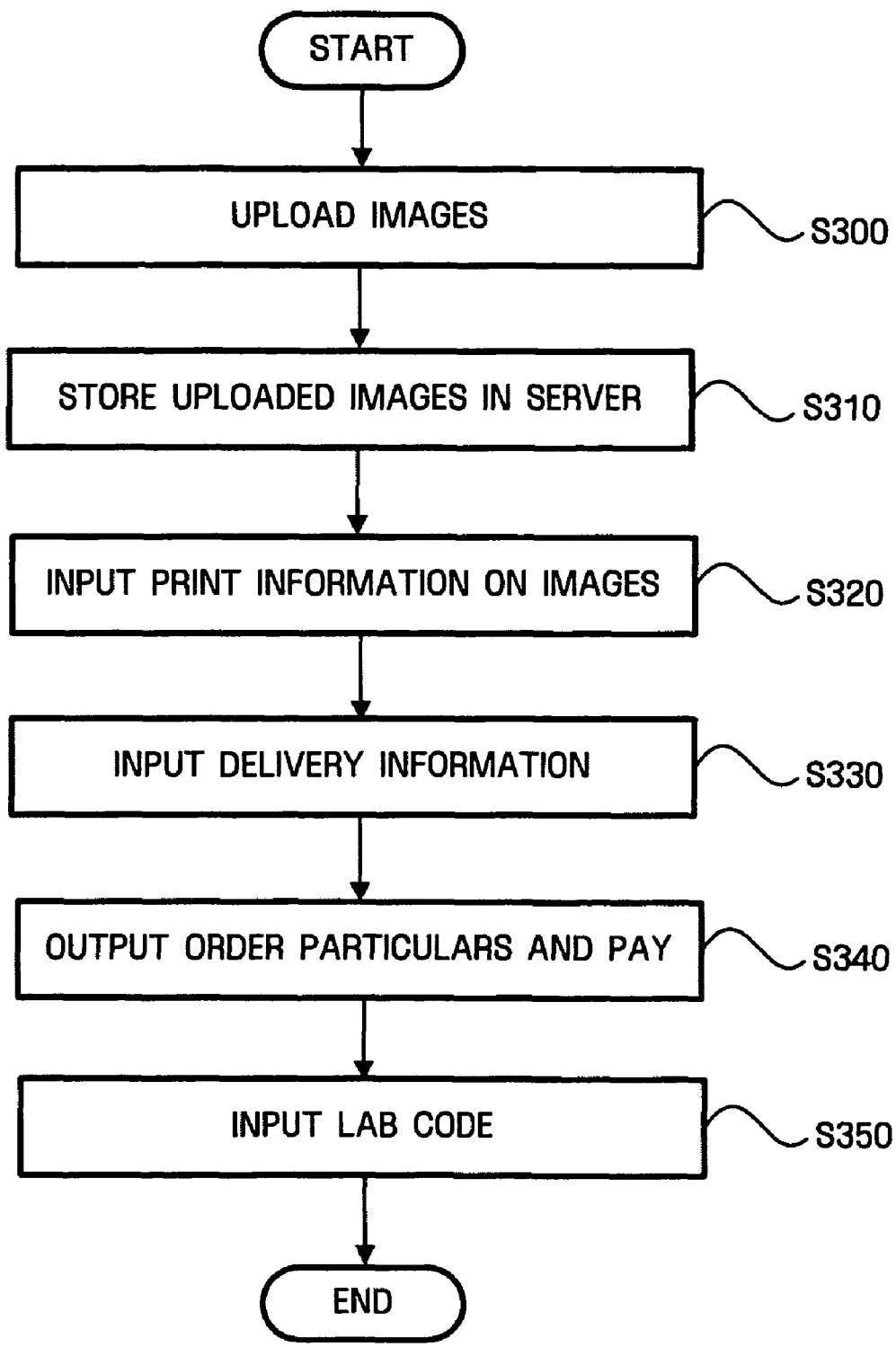
FIG. 3 is a flowchart illustrating a general process of printing photographs over the Internet.

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and exemplary embodiments of the present invention will only be defined by the appended claims. Like reference numerals refer to like elements throughout the specification.

Exemplary embodiments of the present invention will be described below with reference to the accompanying drawings such as block diagrams or flowcharts for describing an apparatus, system and method for providing an Internet print service in a home network. It will be understood that blocks in the accompanying block diagrams and combinations of steps in flow charts can be performed by computer program instructions. These computer program instructions can be provided to processors of, for example, general-purpose computers, special-purpose computers, and programmable data processing apparatuses. Therefore, the instructions performed by the computer or the programmable data processing apparatus create means for executing functions described in the blocks in the block diagrams or the steps in the flow charts. The computer program instructions can be stored in a computer usable memory or a computer readable memory of the computer or the programmable data processing apparatus in order to realize the functions in a specific manner. Therefore, the instructions stored in the computer available memory or the computer readable memory can manufacture products including the instruction means for performing the functions described in the blocks in the block diagrams or the steps in the flow charts. Also, the computer program instructions can be loaded into the computer or the computer programmable data processing apparatus. Therefore, a series of operational steps is performed in the computer or the programmable data processing apparatus to generate a process executed by the computer, which makes it possible for the instructions operating the computer or the programmable data processing apparatus to provide steps of executing the functions described in the blocks of the block diagrams or the steps of the flow charts.

Each block or each step may indicate a portion of a code, a module, or a segment including one or more executable instructions for performing a specific logical function (or functions). It should be noted that, in some modifications of the invention, the functions described in the blocks or the steps may be generated out of order. For example, two blocks or steps shown sequentially can be performed at the same time, or they can be performed in reverse order according to the corresponding functions.

Figure 4:
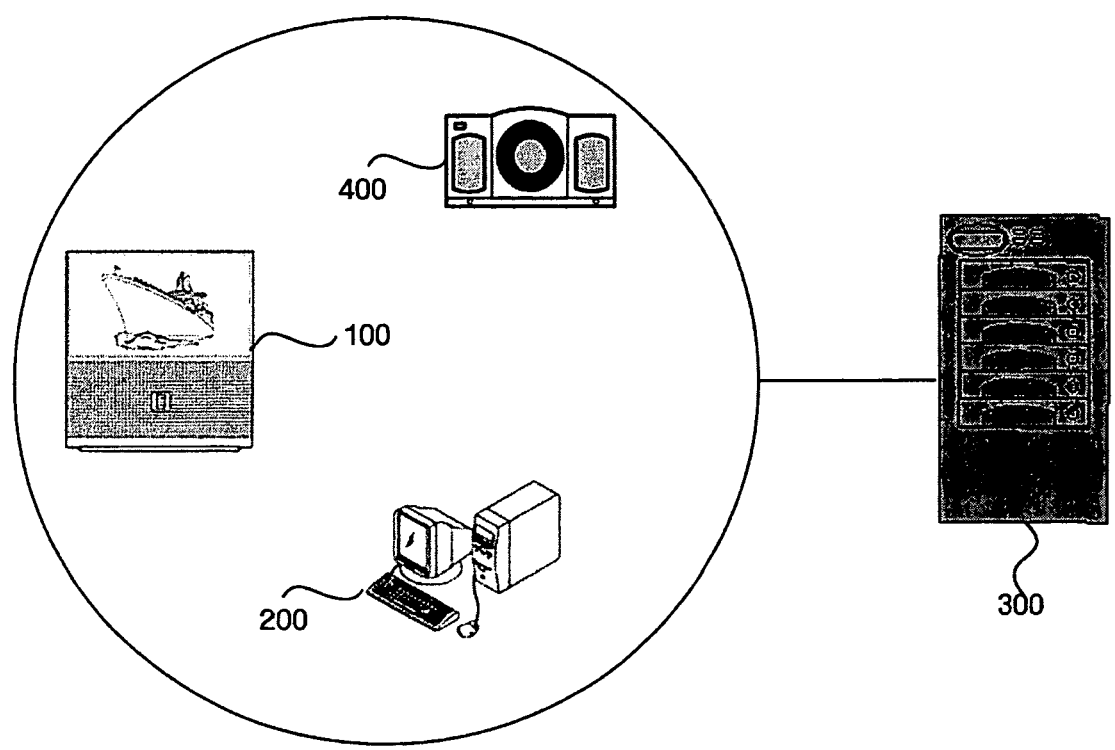
FIG. 4 is a diagram illustrating a system which provides an Internet print service in a home network in accordance with an exemplary embodiment of the present invention.

FIG. 4 is a diagram illustrating a system which provides an Internet print service in a home network in accordance with an exemplary embodiment of the present invention.

As shown in FIG. 4, a system providing an Internet print service in a home network includes a UPnP printer control point 100, a UPNP printer-controlled device 200, and an Internet print service server 300. The UPnP printer-controlled device 200 according to an exemplary embodiment of the present invention provides a photo-printing service to an application mounted with the UPnP printer control point, over the external Internet 100, on the basis of a UPnP framework, which is TCP/IP-based home network middleware.

The UPnP printer control point 100 controls the UPnP printer-controlled device 200, and sends a request for a print service to the UPnP printer-controlled device 200 to print predetermined data.

In addition, it is possible for the UPNP printer control point 100 to upload data to be printed to the UPnP printer-controlled device 200 and an Internet print site by using the HTTP POST protocol.

For example, when data transport protocols of the UPnP printer control point 100 and the Internet print site are different from each other, the UPnP printer control point 100 uploads data by using the HTTP POST protocol. When the Internet print site does not support the corresponding protocol, the UPnP printer control point 100 cannot upload the data to the Internet print site. Therefore, the UPnP printer control point 100 transmits the data to be printed to the UPnP printer-controlled device 200, and the UPnP printer-controlled device 200 uploads the data to the printed to the Internet print site.

On the other hand, when the UPnP printer control point 100 and the Internet print site use the same data transport protocols, it is possible for the UPnP printer control point 100 to directly upload the data to be printed to the Internet print site.

The UPNP printer-controlled device 200 makes a request for the Internet print service to the Internet print service server 300 in response to the print service request of the UPNP printer control point 100. Here, the UPNP printer-controlled device 200 installs software for the Internet print service, and then performs the print service while communicating with the Internet print service server 300. Hereinafter, a process of installing software for the Internet print service will be described with reference to FIG. 7.

When the UPnP printer-controlled device 200 is connected to the print-service-providing site and makes a request for the print service to print the predetermined data, the Internet print service server 300 performs the print service for the corresponding data. Here, the Internet print service server 300 performs authentication of the user, who has made a request for the print service, and checks the remaining cash points. Here, if the user having requested the print service is authorized, and there is sufficient cash points, the Internet print service server 300 prints the uploaded data.

For example, in an Ethernet-based home network a DTV mounted with the UPnP printer control point 100 and a user PC having the UPnP printer-controlled device 200 installed therein are provided, the DTV has a USB interface and thus can play images stored in a capturing device 400 (e.g., a digital camera). Data in the PC can also be played on the DTV.

Next, while playing the images stored in the digital camera on the DTV, the user selects a photo-print menu through the DTV in order to print the images currently being played, and selects the "photo-print" menu item provided on a screen of the DTV.

Further, the UPnP printer control point 100 mounted in the DTV makes a request for a print job to the UPnP printer-controlled device 200 installed in the PC. The UPnP printer-controlled device 200 is connected to the Internet print site and makes a request for user authentication.

Subsequently, the Internet print service server 300 performs the user authentication. If the user is a registered member of the Internet print site, it is possible for the user to use the Internet print service for the predetermined data.

Therefore, it is possible for the user to conveniently use the photo-printing service over the Internet by using the device in the home network.

Figure 5:
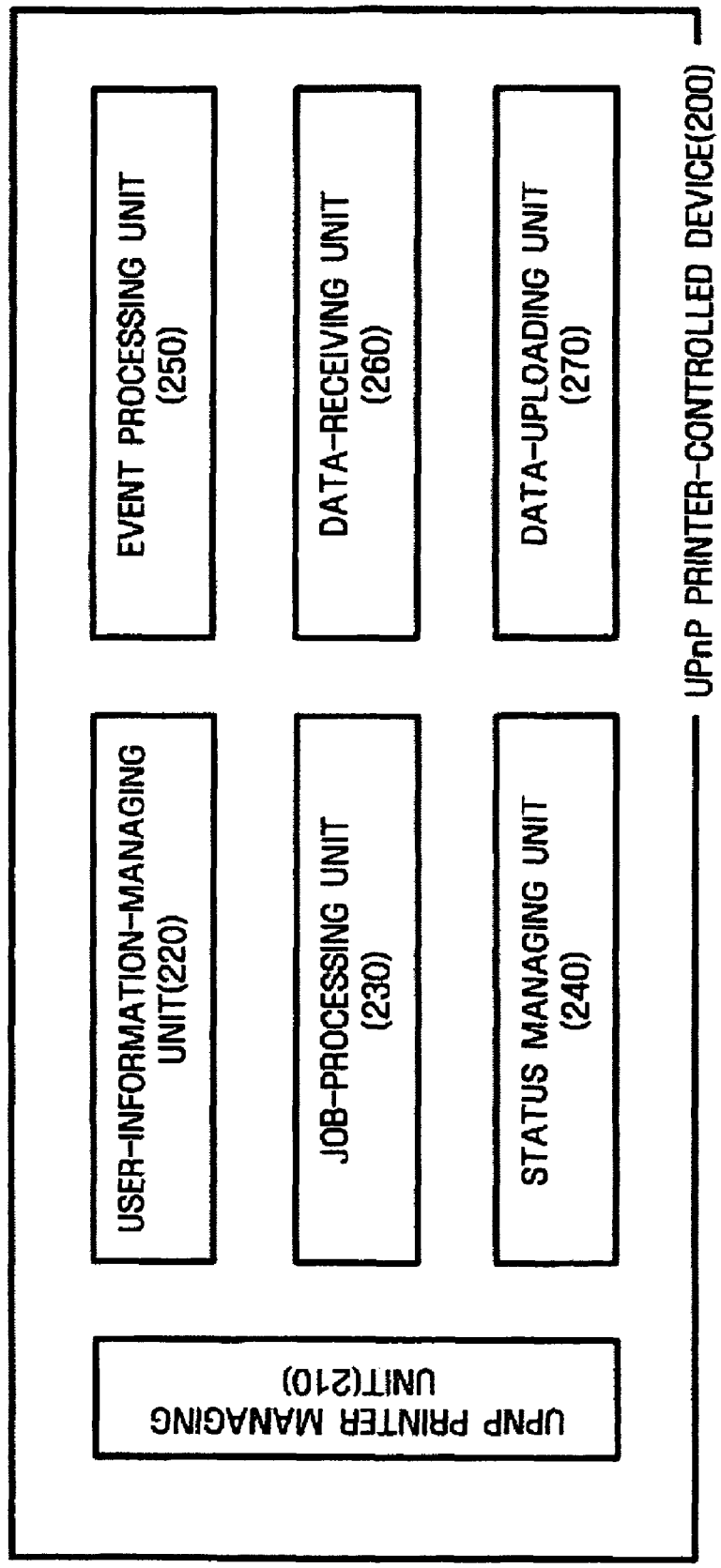
FIG. 5 is a block diagram illustrating an internal construction of a UPnP printer-controlled device which provides an Internet print service in a home network in accordance with another exemplary embodiment of the present invention.

FIG. 5 is a block diagram illustrating an internal construction of a UPnP printer-controlled device which provides an Internet print service in a home network in accordance with another exemplary embodiment of the present invention.

As shown in FIG. 5, the UPnP printer-controlled device 200 includes a UPnP printer managing unit 210, a user-information-managing unit 220, a job-processing unit 230, a status managing unit 240, an event processing unit 250, a data-receiving unit 260, and a data-uploading unit 270.

Here, the term "unit" used in the present exemplary embodiments can mean software, or a hardware component such as an FPGA (Field Programmable Gate Array) or an ASIC (Application Specific Integrated Circuit) and the units each perform assigned roles. However, the units are not limited to software or hardware. The units may be configured in an addressable storage medium, or may be configured to run on at least one processor. Therefore, as an example, the units include: components such as software components, object-oriented software components, class components, and task components; processors, functions, attributes, procedures, sub-routines, segments of program codes, drivers, firmware, microcodes, circuits, data, databases, data structures, tables, arrays, and variables. The functions provided by the components and the units may be combined into fewer components and units or may be separated into additional components and units. In addition, the components and the units may be configured to execute at least one CPU in a device or a security multimedia card.

The UPnP printer managing unit 210 provides an interface to use a service provided by the UPnP printer-controlled device 200 and receives a print job request from the UPnP printer control point 100.

For example, the UPnP printer control point 100 may create an instance of the UPnP printer managing unit 210 in order to perform a printing task requested by the application, and call the interface provided by the UPnP printer managing unit 210.

The user-information-managing unit 220 manages information requested when using the Internet print service. Specifically, the user-information-managing unit 220 manages information necessary to check user information and print photographs. Here, the user information can include a URL of the Internet print site, a user's login name, a password, a user delivery address, and the like.

The job-processing unit 230 processes a print service request or a print service cancel job in response to a print job request of the UPnP printer-managing unit 210. Here, the job-processing unit 230 requests/provides necessary information from/to an external Internet print site in order to perform the print job requested by the UPNP printer control point 100. Here, the existing Web service or Vender-Defined protocol may be used in a method of requesting and receiving corresponding information.

The status managing unit 240 manages status information on the UPNP printer-controlled device 200. The event processing unit 250 processes an event message sent from the UPnP framework, and sends a corresponding event message when status of the Internet print site, printing status or delivery status has been changed.

The data-receiving unit 260 receives predetermined data transmitted by the UPnP printer control point 100.

The data-uploading unit 270 uploads the data, which is received by the data-receiving unit 260, to the external Internet print site. Here, the data-uploading unit 270 can use various types of protocols such as HTTP POST, FTP (File Transfer Protocol), and the like.

FIG. 6 is a diagram illustrating a description of a UPnP printer-controlled device which provides an Internet print service in a home network in accordance with still another exemplary embodiment of the present invention.

As shown in FIG. 6, the URL of the Internet print site is specified in the description of the UPnP printer-controlled device 200 through an attribute <manufactureURL> which is a markup document. Therefore, it is possible to check user information through the corresponding URL at the request of the Internet print service from the UPNP printer control point 100.

In addition, it is possible for the user to easily notice the corresponding site by specifying a brand name of the corresponding Internet print service in a <ModelName> element 1.

For example, when there are multiple UPnP printer-controlled devices at home, it is possible for the user to find out the UPnP printer-controlled device which provides an Internet print service through the <ModelName>.

Figure 7:
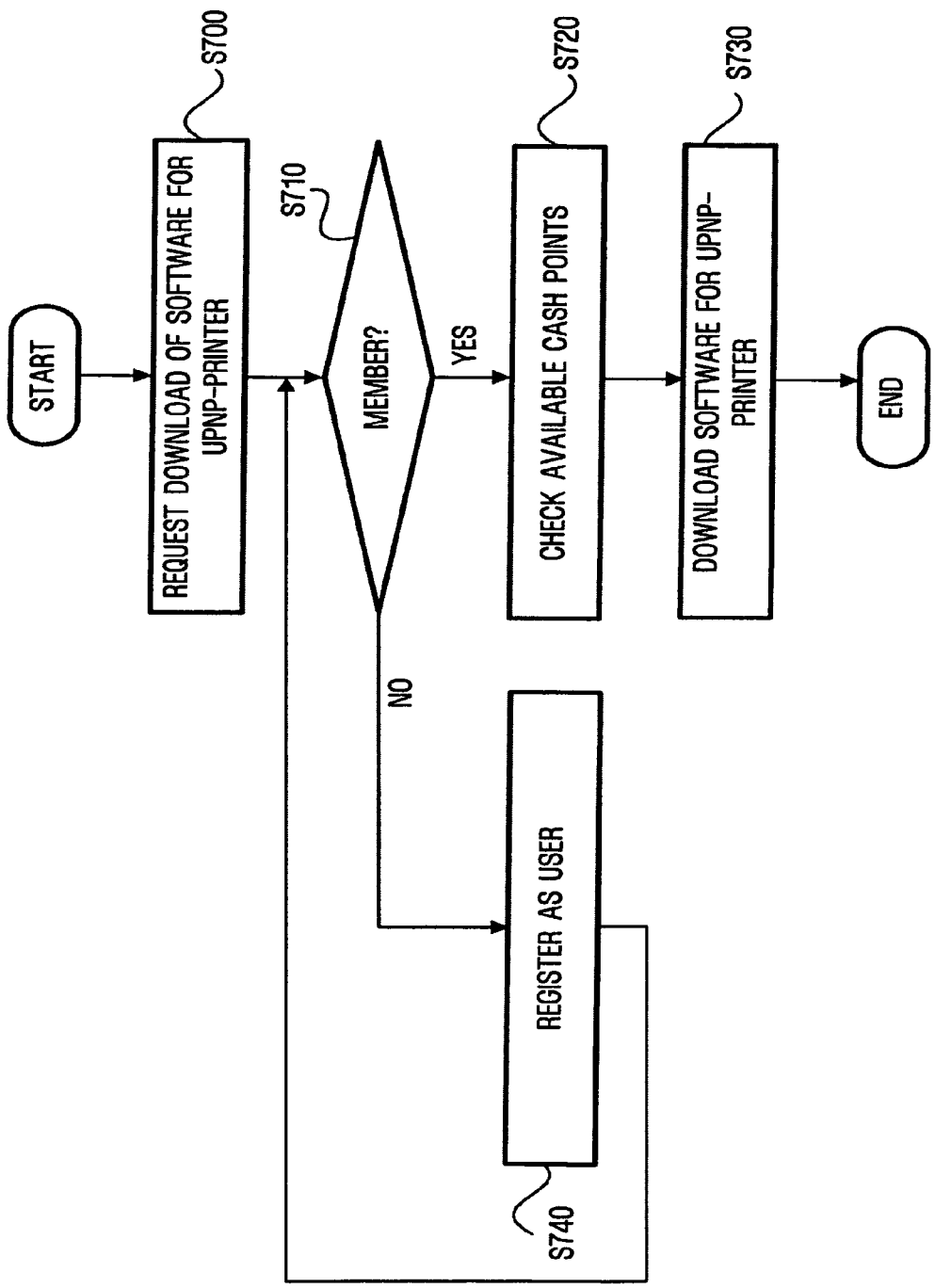
FIG. 7 is a flowchart illustrating a process of installing software for an Internet print service in a UPnP printer-controlled device which provides an Internet print service in a home network in accordance with yet another exemplary embodiment of the present invention.

FIG. 7 is a flowchart illustrating a process of installing software for an Internet print service in a UPnP printer-controlled device which provides an Internet print service in a home network in accordance with yet another exemplary embodiment of the present invention.

First, if the user requests the Internet print site to download software to the UPnP printer-controlled device 200 (S700), the Internet print service server 300 checks whether the user is a member or not (S710).

Accordingly, the user inputs user information (e.g., login name, cellular phone number and delivery address), and the Internet print service server 300 checks whether the user is a member on the basis of the input user information.

When the user is the member of the Internet print site, the Internet print service server 300 checks the remaining cash points available to print images (S720), and the Internet print service server 300 downloads the software for the UPnP printer to the UPnP printer-controlled device 200 (S730).

In addition, when there are no remaining cash points, the Internet print service server 300 checks whether or not the user will fill cash points. If the user makes a request for filling cash points, the Internet print service server 300 will fill the user's cash points.

On the other hand, if the user is not a member, the Internet print service server 300 checks whether or not the user will register at the Internet print site and provides a new user registration procedure (S740). Here, if the user will not register at the Internet print site, the Internet print service server 300 sends the UPNP printer control point 100 a message indicating that the user cannot use the Internet print service.

Figure 8A:
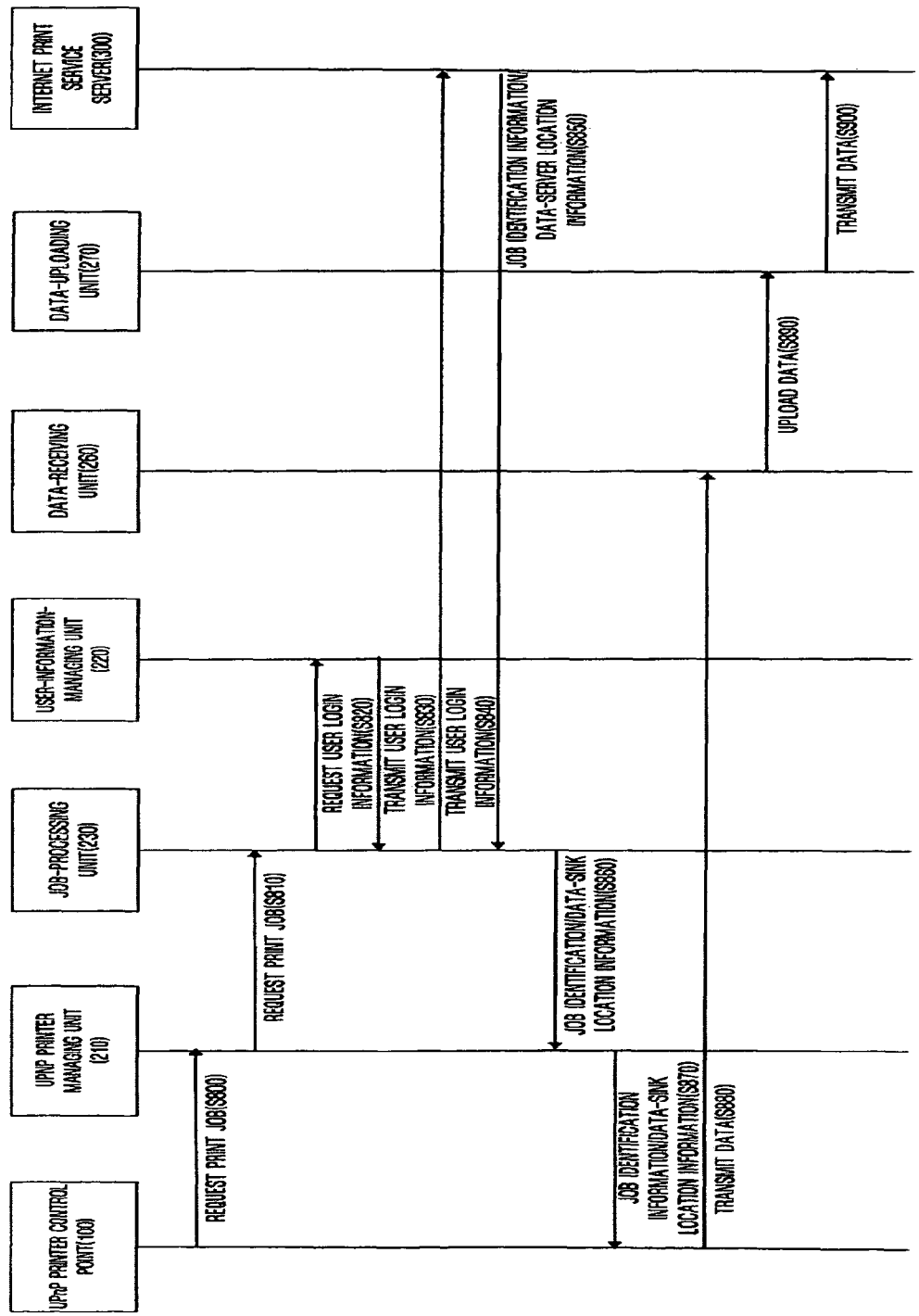
FIG. 8A is a flowchart illustrating a process of using an Internet print service when the UPNP printer control point and the Internet print service server have data transport protocols different from each other.
Figure 8B:
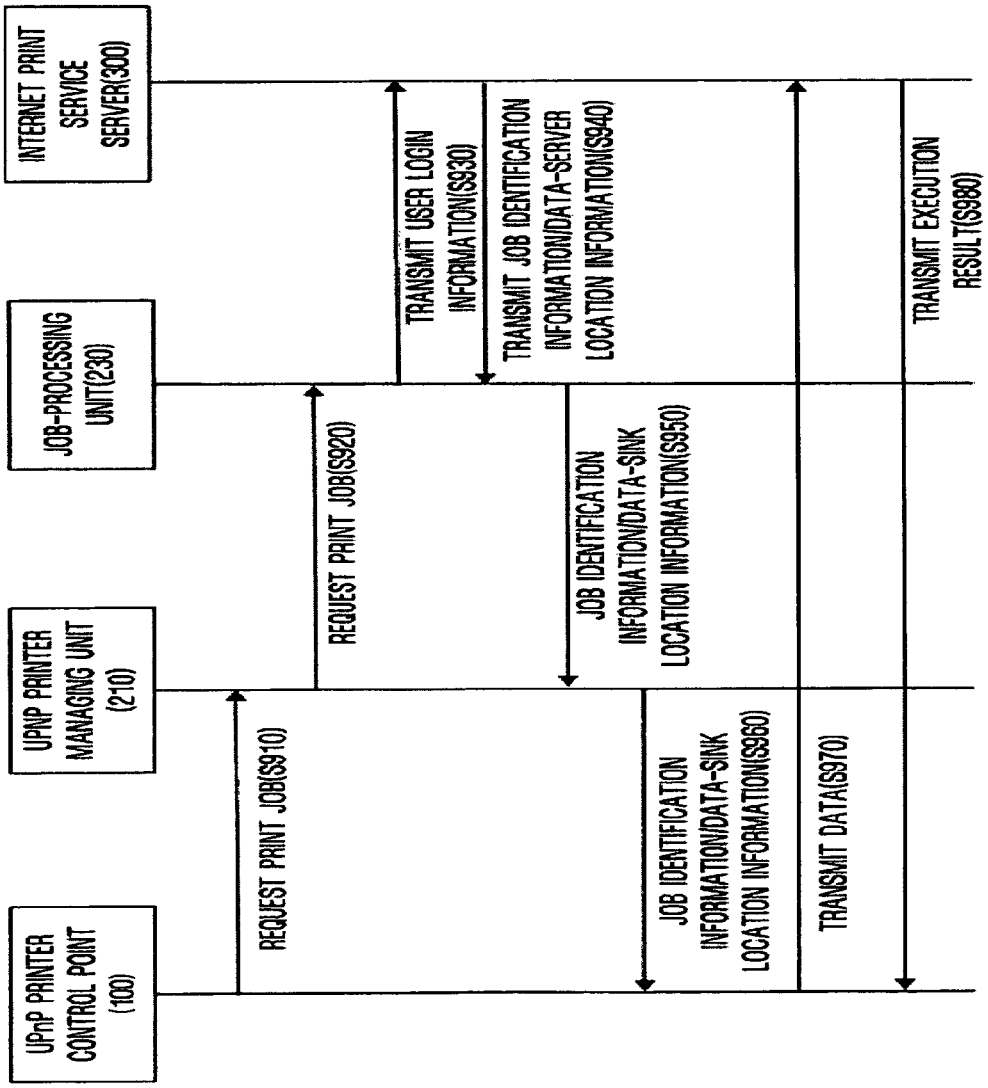
FIG. 8B is a flowchart illustrating a process for using an Internet print service when the UPNP printer control point and the Internet print service server have the same data transport protocols.

FIGS. 8A and 8B are flowcharts illustrating a process for requesting an Internet print service according to a method of providing an Internet print service in a home network in accordance with an exemplary embodiment of the present invention. FIG. 8A is a diagram illustrating a process of using an Internet print service when the UPNP printer control point 100 and the Internet print service server 300 have data transport protocols different from each other. FIG. 8B is a diagram illustrating a process for using an Internet print service when the UPNP printer control point 100 and the Internet print service server 300 have the same data transport protocols.

As shown in FIG. 8A, when the user selects an "Internet print service" menu item provided on a screen of a device mounted with the UPnP printer control point 100 (e.g., DTV), the UPNP printer control point 100 makes a request for a print job to the UPnP printer-controlled device 200 (e.g., personal computer) (S800).

Next, the UPnP printer managing unit 210 of the UPnP printer-controlled device 200 makes a request for a print job to the job-processing unit 230 (S810). The job-processing unit 230 makes a request for user login information (e.g., login name and password) to the user-information-managing unit 220 (S820).

Further, when the user-information-managing unit 220 retrieves and transmits user login information in response to the request of the job-processing unit 230 (S830), the job-processing unit 230 transmits the transmitted user login information to the Internet print service server 300 (S840). The Internet print service server 300 performs user authentication and checks the remaining cash points on the basis of the transmitted login information.

When the user that makes the request for the print job is a registered member of the Internet print site, and there remain sufficient cash points for using the Internet print service, the Internet print service server 300 transmits to the job-processing unit 230, data-server location information (DataServer URL) used for uploading data and job identification information (JobID) on the print job (S850). Here, as a result of such check, if the user is not a registered member of the Internet print site or the remaining cash points are insufficient, the Internet print service server 300 sends the UPNP printer-controlled device 200 a message indicating that the user cannot use the print service. Here, the data-server location information refers to information used for the UPnP printer-controlled device 200 to upload data to the Internet print site.

Next, the job-processing unit 230, which has received the data-server location information and the job identification information, creates a data receiver thread receiving data from the UPnP printer control point 100 and a data uploader thread to upload data, received from the UPnP printer control point 100, to the Internet print service server 300.

Subsequently, the job-processing unit 230 transmits data-sink location information (DataSink URL) and job identification information to the UPnP printer managing unit 210 (S860). Here, the job identification information transmitted by the job-processing unit 230 may be the same as job identification information transmitted by the Internet print site. In addition, the data-sink location information is local storage information used by the UPnP printer control point 100 and the UPnP printer-controlled device 200 in the home network, and is used when the UPnP printer control point 100 transmits data to be printed. Here, the data-sink location information is different from data-server location information used for the UPNP controlled device 200 to upload data to the Internet print site.

Further, the UPnP printer managing unit 210 transmits the data-sink location information and the job identification information to the UPNP printer control point 100 (S870).

Next, the UPnP printer control point 100 uploads the data to be printed to the data-receiving unit 260 on the basis of the data-sink location information (S880). Here, since the UPnP printer control point 100 and the Internet print site have data transport protocols different from each other, it may be impossible for the UPnP printer control point 100 to directly upload the data to the Internet print site. In addition, a job for uploading data is asynchronously performed and an HTTP is used.

The data-receiving unit 260 receives the data uploaded from the UPNP printer control point 100, and transmits the received data to the data-uploading unit 270 (S890).

The data-uploading unit 270 uploads the data to be printed to the Internet print site on the basis of the data-server location information (S900).

Therefore, it is possible for the user to conveniently use the Internet print service which is provided from the outside by using the device in the UPnP framework-based home network.

As shown in FIG. 8B, if the user selects an "Internet print service" menu item displayed on a screen of a device mounted with the UPnP printer control point 100 (e.g., DTV), the UPnP printer control point 100 makes a request for a print job to the UPnP printer-controlled device 200 (e.g., personal computer) (S910).

The UPnP printer managing unit 210 of the UPnP printer-controlled device 200 makes a request for a print job to the job-processing unit 230 (S920). The job-processing unit 230 makes a request for user login information (e.g., login name and password) to the UPnP printer managing unit 210.

Next, when the job-processing unit 230 transmits the user login information transmitted from the job-processing unit 230 to the Internet print service server 300 (S930), the Internet print service server 300 performs user authentication and checks the amount of the remaining cash points on the basis of the transmitted login information.

When the user having requested the print job is a registered member of the Internet print site, and there remain cash points sufficient to use the Internet print service, the Internet print service server 300 transmits to the job-processing unit 230, data-server location information to upload data and job identification information on the print job (S940). Here, when the user is not a registered member of the Internet print site, or the remaining cash points are insufficient, the Internet print service server 300 sends the UPnP printer-controlled device 200 a message indicating that the user cannot use the print service.

Further, the job-processing unit 230 transmits data-sink location information and job identification information to the UPnP printer managing unit 210 (S950). Here, the job identification information transmitted by the job-processing unit 230 may be the same as the job identification information transmitted form the Internet print site. The data-sink location information corresponds to local storage URL used by the UPnP printer control point 100 and the UPNP printer-controlled device 200 in the home network. In this case, the data-sink location information is equal to the data-server location information used for the UPnP printer-controlled device 200 to upload the data to the Internet print site. Therefore, the UPNP printer-controlled device 200 may transmit the data-server location information instead of the data-sink location information.

Subsequently, when the UPnP printer managing unit 210 transmits the data-sink location information and the job identification information to the UPnP printer control point 100 (S960), the UPnP printer control point 100 directly uploads the data to be printed to the Internet print site by using the data-sink location information transmitted in response to the request of the print job (S970).

When the data is completely uploaded to the Internet print site, the Internet print site server 300 sends the UPnP printer control point 100 a message indicating that the data is successfully uploaded (S980).

Accordingly, it is possible for the user to conveniently use the Internet print service by using the device mounted with the UPNP printer control point 100 (e.g., a DTV).

Figure 9:
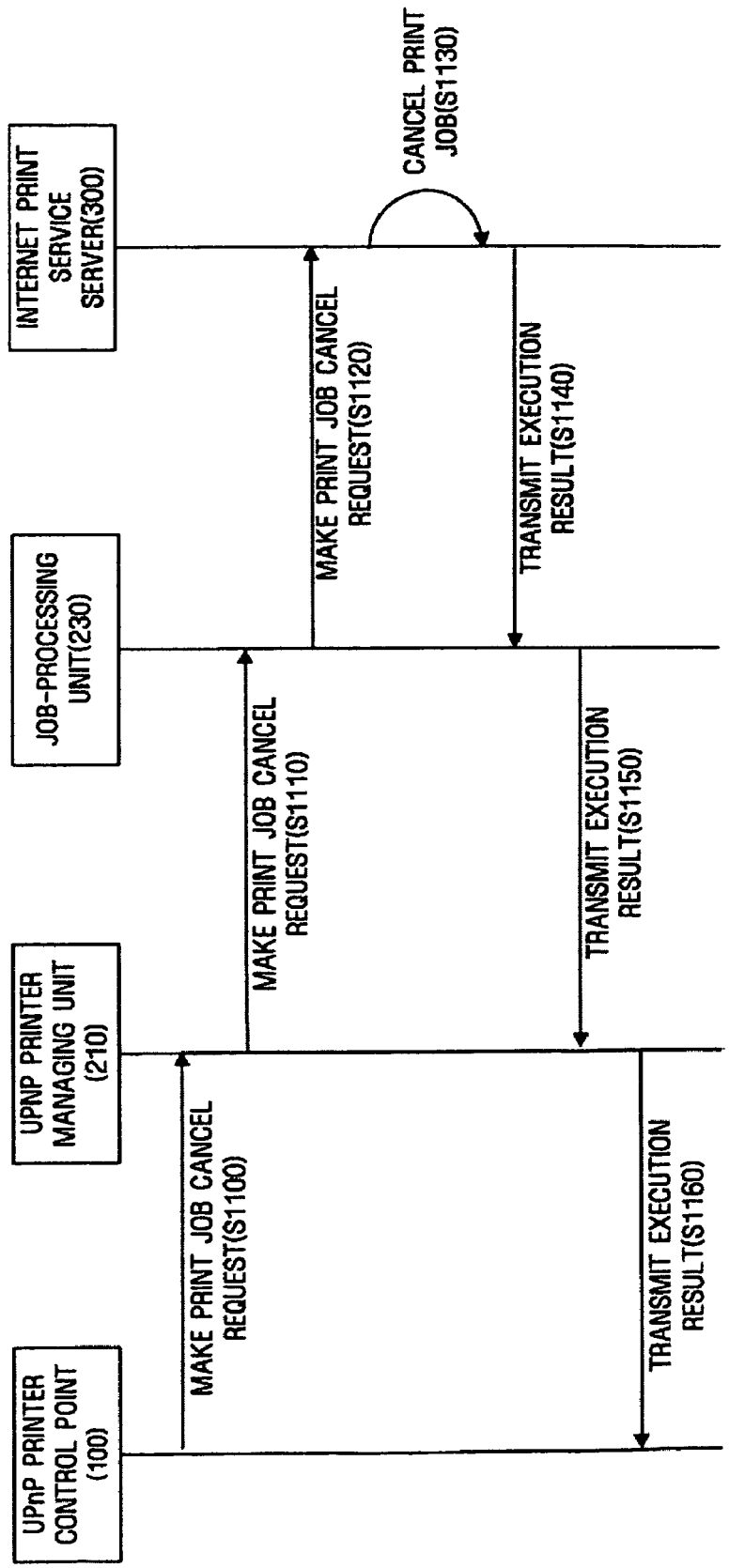
FIG. 9 is a flowchart illustrating a process of canceling an Internet print service according to a method of providing an Internet print service in a home network in accordance with another exemplary embodiment of the present invention.

FIG. 9 is a flowchart illustrating a process of canceling an Internet print service of a method of providing an Internet print service in a home network in accordance with another exemplary embodiment of the present invention.

First, when the user selects an "Internet print service cancel" menu item displayed on a screen of a device mounted with the UPnP printer control point 100 (e.g., DTV), the UPNP printer control point 100 makes a print job cancel request to the UPNP printer-controlled device 200 (e.g., a personal computer) (S 1100).

The UPnP printer managing unit 210 of the UPnP printer-controlled device 200 makes a print job cancel request to the job-processing unit 230 (S1110), and the job-processing unit 230 sends a message making a print job cancel request to the Internet print service server 300 by using job identification information (S1120).

Next, the Internet print service server 300 deletes uploaded images (S1130) and sends the job-processing unit 230 an message indicating that the print job has been cancelled (S1140).

Further, the job-processing unit 230 deletes data related to the job identification information and then transmits a result showing that the print job has been cancelled to the UPnP printer managing unit 210 (S1150).

Accordingly, the UPnP printer managing unit 210 transmits a result showing that the print job has been cancelled to the UPnP printer control point 100 (S1160), and the UPnP printer control point 100 displays a message indicating that the print job has been cancelled on the DTV screen.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

The apparatus, system and method for providing an Internet print service in a home network according to exemplary embodiments of the present invention produce the following exemplary results.

It is possible for the user to conveniently use an Internet print service which is provided from the outside to print images by using a device in a home network.

It is also possible for the user to be provided with an Internet print service only by installing software for the UPnP printer, and user convenience can be greatly improved because an additional data uploading process for the Internet print service is not required.

What is claimed is:

1. An apparatus for providing an Internet print service in a home network, the apparatus comprising:
    a UPnP printer managing unit supplying an interface to provide an Internet print service and receiving a print job request from a UPnP printer control point;
    a job-processing unit making a request for a print service to an external Internet print site in response to the print job request;
    a user-information-managing unit managing information necessary when the Internet print service is used;
    a data-receiving unit receiving the data transmitted from the UPnP printer control point; and
    a data-uploading unit uploading the data received by the data-receiving unit to the exterior Internet print site.

2. The apparatus of claim 1, wherein the UPnP printer managing unit supplies the interface by analyzing a markup document containing a model name.

3. The apparatus of claim 1, wherein the job-processing unit receives job identification information and data-server location information from a server of the Internet print site to upload data.

4. The apparatus of claim 3, wherein the data-uploading unit uploads the data received from the UPnP printer control point to the Internet print site on the basis of the job identification information and the data-server location information.

5. The apparatus of claim 4, wherein the UPnP printer control point and the Internet print site use the same protocols, the UPnP printer control point uploads the data to the Internet print site on the basis of job identification information and data-sink location information.

6. A system for providing an Internet print service in a home network, the system comprising:
- a UPnP printer control point receiving a print job request from a user and requesting a print service to print predetermined data;
- a UPnP printer-controlled device sending a request for an Internet print service to an Internet print site in response to the request of the UPnP printer control point; and
- an Internet print service server providing an Internet print service in response to the Internet print service requested from the UPnP printer-controlled device, wherein the UPnP printer-controlled device comprises:
- a UPnP printer managing unit supplying an interface to provide the Internet print service and receiving a print job request from the UPnP printer control point;
- a job-processing unit making a request for a print service or a print service cancel job to an exterior Internet print site, depending on the print job request;
- a user-information-managing unit managing information necessary when the Internet print service is used;
- a data-receiving unit receiving the data transmitted from the UPnP printer control point; and
- a data-uploading unit uploading the data received by the data-receiving unit to the exterior Internet print site.

7. The system of claim 6, wherein the UPnP printer-controlled device receives job identification information and data-server location information to upload the data from the Internet print service server.

8. The system of claim 6, wherein the UPnP printer managing unit supplies the interface by analyzing an markup document containing a model name.

9. The system of claim 6, wherein the data-uploading unit uploads the data received form the UPnP printer control point to the Internet print site on the basis of job identification information and data-server location information.

10. The system of claim 9, wherein the UPnP printer control point uploads the data to the Internet print site on the basis of job identification information and data-sink location information when the UPnP printer control point and the Internet print site use the same protocols.

\* \* \* \* \*